(12) United States Patent
Sato et al.

(10) Patent No.: US 6,532,205 B2
(45) Date of Patent: Mar. 11, 2003

(54) DISK CENTERING APPARATUS (75) Inventors: Hiroyuki Sato, Kanagawa (JP); Yutaka Fukuyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 37 days.

(21) Appl. No.: 09/730,059

(22) Filed: Dec. 5, 2000

(65) Prior Publication Data

US 2001/0030929 A1 Oct. 18, 2001

(30) Foreign Application Priority Data

Dec. 10, 1999 (JP) .......................................... 11-351361

(51) Int. Cl.[7] .......................... G11B 23/00; G11B 25/00
(52) U.S. Cl. ..................................................... 369/270
(58) Field of Search ................................. 369/270, 271, 369/291, 264; G11B 9/06, 17/02, 25/04, 17/03, 17/28, 19/20

(56) References Cited

U.S. PATENT DOCUMENTS

| | | | | |
|---|---|---|---|---|
| 3,898,814 A | * | 8/1975 | Chou et al. ................. | 369/261 |
| 4,649,531 A | * | 3/1987 | Horowitz et al. ........... | 369/270 |
| 4,730,300 A | * | 3/1988 | Kamoshita et al. ......... | 369/270 |
| 4,791,624 A | * | 12/1988 | Stinesen ..................... | 369/270 |
| 5,457,676 A | * | 10/1995 | Park ............................ | 369/270 |
| 5,501,760 A | * | 3/1996 | Mukawa ...................... | 369/270 |
| 5,757,762 A | * | 5/1998 | Lee .............................. | 369/271 |
| 5,761,186 A | * | 6/1998 | Mushika et al. ............ | 369/271 |
| 5,889,757 A | * | 3/1999 | Mori et al. .................. | 369/270 |

FOREIGN PATENT DOCUMENTS

EP          00492651 A2 *  1/1997   ........... G11B/23/00

* cited by examiner

Primary Examiner—William Korzuch
Assistant Examiner—Christopher R Beacham
(74) Attorney, Agent, or Firm—Oblon, Spivak, McClelland, Maier & Neustadt, P.C.

(57) ABSTRACT

A disk centering apparatus includes a disk table member and a movable member. An inner circumferential portion of the disk table member is secured to an upper portion of a motor shaft. An outer circumferential portion of a greater diameter is disposed lower than an upper surface of and concentrically with the inner circumferential portion and has an upper surface for receiving a disk thereon. Connecting portions extend radially outwardly from the inner circumferential portion. The movable member includes a supported shaft portion mounted for sliding movement on the motor shaft and disposed lower than the disk table member. A guiding portion is provided adjacent an outer surface side of the supported shaft portion and includes a guiding inclined portion formed at an upper portion thereof and a diameter greater than the inner circumference portion. The movable member is biased upwardly in a direction of the motor shaft.

12 Claims, 10 Drawing Sheets

DISK CENTERING APPARATUS

BACKGROUND OF THE INVENTION

This invention relates to a disk centering apparatus, and more particularly to a disk centering apparatus for centering and mounting a disk-type recording medium.

A disk recording and/or playback apparatus records and/or plays back an information signal onto and/or from a disk-type recording medium. A disk recording and/or playback apparatus of the type mentioned includes a disk centering apparatus for mounting a disk-type recording medium in a centered state.

In order to assure a high degree of accuracy in centering a disk-type recording medium, a conventional disk centering apparatus includes a movable member mounted for movement in an axial direction of a motor shaft, and the movable member is inserted in a center hole of the disk-type recording medium.

Figure 1:
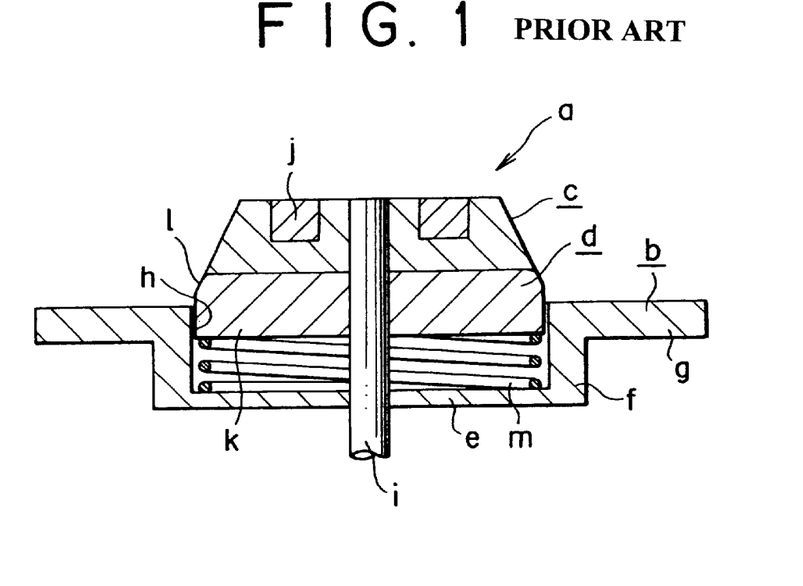
FIG. 1 is a vertical sectional view showing a conventional disk centering apparatus in a state before a disk-type storage medium is mounted.
Figure 2:
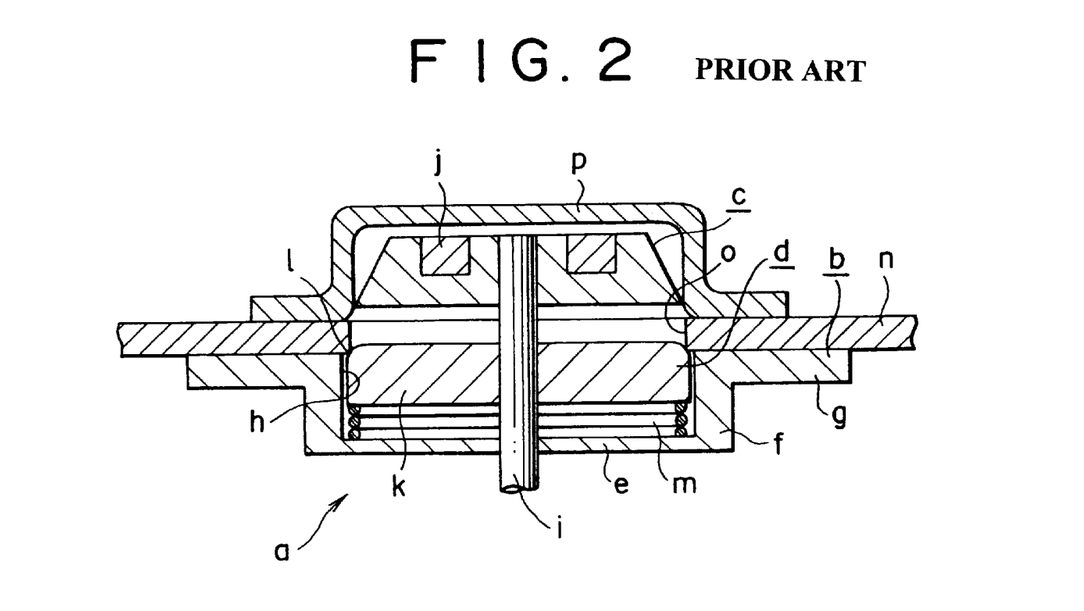
FIG. 2 is a vertical sectional view showing the conventional disk centering apparatus in a state when a disk-type storage medium is mounted.

An example of the conventional disk centering apparatus of the type described is shown in FIGS. 1 and 2.

Referring to FIGS. 1 and 2, the conventional disk centering apparatus a shown includes a disk table member b, a guiding member c, and a movable member d.

The disk table member b is formed as a unitary member from an annular fixed portion e, an upright portion f extending upwardly from an outer peripheral edge of the fixed portion e, and a receiving portion g extending outwardly from an upper end of the upright portion f. A recess h is defined by the fixed portion e and the upright portion f and is open upwardly. The disk table member b is secured at the fixed portion e thereof to an intermediate potion in an axial direction of a motor shaft i of a spindle motor not shown.

The guiding member c has a truncated conical shape such that the diameter thereof increases downwardly, and has a magnet j embedded therein. The guiding member c is secured to the top end of the motor shaft i.

The movable member d is formed as a unitary member from an annular base portion k and a receiving portion l of a truncated conical shape provided on the upper side of the base portion k. The receiving portion l is formed such that the diameter thereof decreases upwardly, and the outer periphery of the receiving portion l has a size equal to that of the outer periphery of the bottom end of the guiding member c.

The movable member d is supported for sliding movement on the motor shaft i between the fixed portion e of the disk table member b and the guiding member c. A compression coil spring m is interposed between the bottom surface of movable member d and the top surface of the fixed portion e and normally biases the movable member d to move toward the guiding member c.

Referring particularly to FIG. 2, when a disk-type recording medium n is moved downwardly so that it is mounted onto the disk centering apparatus a, the guiding member c and the movable member d are successively inserted into a center hole o of the disk-type recording medium n. Thereupon, the disk-type recording medium n is contacted at a lower side opening edge of the center hole o thereof with the receiving portion l of the movable member d and moves the movable member d downwardly against the biasing force of the compression coil spring m until the bottom surface of the disk-type recording medium n is brought into contact with the receiving portion g of the disk table member b. At this time, a chucking pulley p formed from a magnetic metal material is attracted to the magnet j embedded in the guiding portion c so that the disk-type recording medium n is held and mounted by and between the chucking pulley p and the disk table member b.

When the disk-type recording medium n is in the mounted position, the movable member d is at its downwardly moved position and the disk-type recording medium n is placed on and received by the receiving portion g of the disk table member b. Consequently, the disk-type recording medium n is positioned appropriately in the vertical direction in FIG. 2. Further, since the lower side opening edge of the center hole o of the disk-type recording medium n is received by the receiving portion l, even if the center hole o is formed with some dimensional tolerance by working, the eccentricity of the disk-type recording medium n in its mounted position is suppressed to the minimum.

Since the eccentricity of the disk-type recording medium is suppressed to the minimum in this manner, even when it is rotated at a high speed, a recording operation and a playback operation onto and from the disk-type recording medium can performed appropriately.

Figure 3:
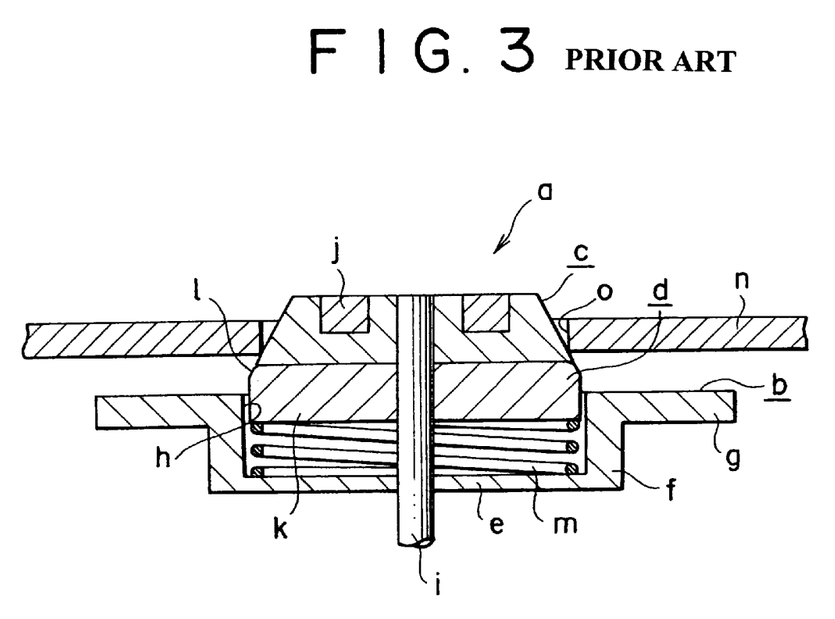
FIG. 3 is a vertical sectional illustrating a problem of the conventional disk centering apparatus.

With the conventional disk centering apparatus described above, however, since the guiding member c is formed as a separate member from the movable member d and secured to the motor shaft i, where the disk-type recording medium to be mounted has a rather small center hole, the lower side opening edge of the center hole may possibly be caught by the guiding member c thereby to hinder the disk-type recording medium from being mounted as seen in FIG. 3.

SUMMARY OF THE INVENTION

It is therefore an object of the present invention to provide a disk centering apparatus which assures appropriate centering of a disk-type recording medium irrespective of the type of the disk-type recording medium.

In order to attain the object described above, according to an aspect of the present invention, there is provided a disk centering apparatus, comprising a disk table member including a substantially cylindrical inner circumferential element secured to an upper portion of a motor shaft and a substantially annular outer circumferential element disposed lower than an upper surface of and concentrically with the inner circumferential element and having a diameter greater than that of the inner circumferential element, the outer circumferential element having an upper surface which serves as a receiving face for receiving a disk thereon, the disk table member further including a plurality of connecting elements extending radially from an outer side of the inner circumferential element to connect the inner circumferential element and the outer circumferential element to each other, and a movable member including a substantially cylindrical supported shaft element mounted for sliding movement on the motor shaft, the supported shaft element being disposed lower than the disk table member, the movable member further including a guiding element provided adjacent an outer circumferential surface side of the supported shaft element for movement together with the supported shaft element and fitted in a space defined by the inner circumferential element, the outer circumferential element and the connecting elements of the disk table member, the guiding element having a guiding inclined element formed at an upper portion thereof for guiding a center hole of the disk, the guiding inclined element having a diameter greater than that of the inner circumference element of the disk table member, the movable member being biased upwardly in a direction of the motor shaft.

According to another aspect of the present invention, there is provided a disk centering apparatus, comprising a substantially cylindrical inner circumferential element secured to an upper portion of a motor shaft, a substantially annular outer circumferential element disposed lower than an upper surface of and concentrically with the inner circumferential element and having a diameter greater than that of the inner circumferential element, the outer circumferential element having an upper surface which serves as a receiving face for receiving a disk thereon, a plurality of connecting elements extending radially from an outer side of the inner circumferential element to connect the inner circumferential element and the outer circumferential element to each other, and a movable member disposed at a position defined by the inner circumferential element, the outer circumferential element and the connecting elements for connecting the inner circumferential element and the outer circumferential element to each other, the movable member having a guiding inclined portion formed at an upper portion thereof for guiding a center hole of the disk, the movable member being slidably movable in a direction of the motor shaft, the inner circumferential element, the outer circumferential element and the movable element being formed as a unitary member.

With both of the disk centering apparatus, even if the center hole a disk-type recording medium to be mounted onto the disk centering apparatus is formed with some dimensional tolerance in diameter by working, the eccentricity of the disk-type recording medium in its mounted position can be suppressed to the minimum.

Further, since the guiding portion is moved, even if the disk-type recording medium to be mounted has a rather small center hole, it can be mounted at an appropriate position with a lower side opening edge of the center hole contacted with the guiding portion. Consequently, the disk-type recording medium can be mounted with certainty and can be centered appropriately irrespective of the type of the disk-type recording medium.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

Referring to FIGS. 4 to 9, there is shown a disk centering apparatus to which the present invention is applied.

Figure 8:
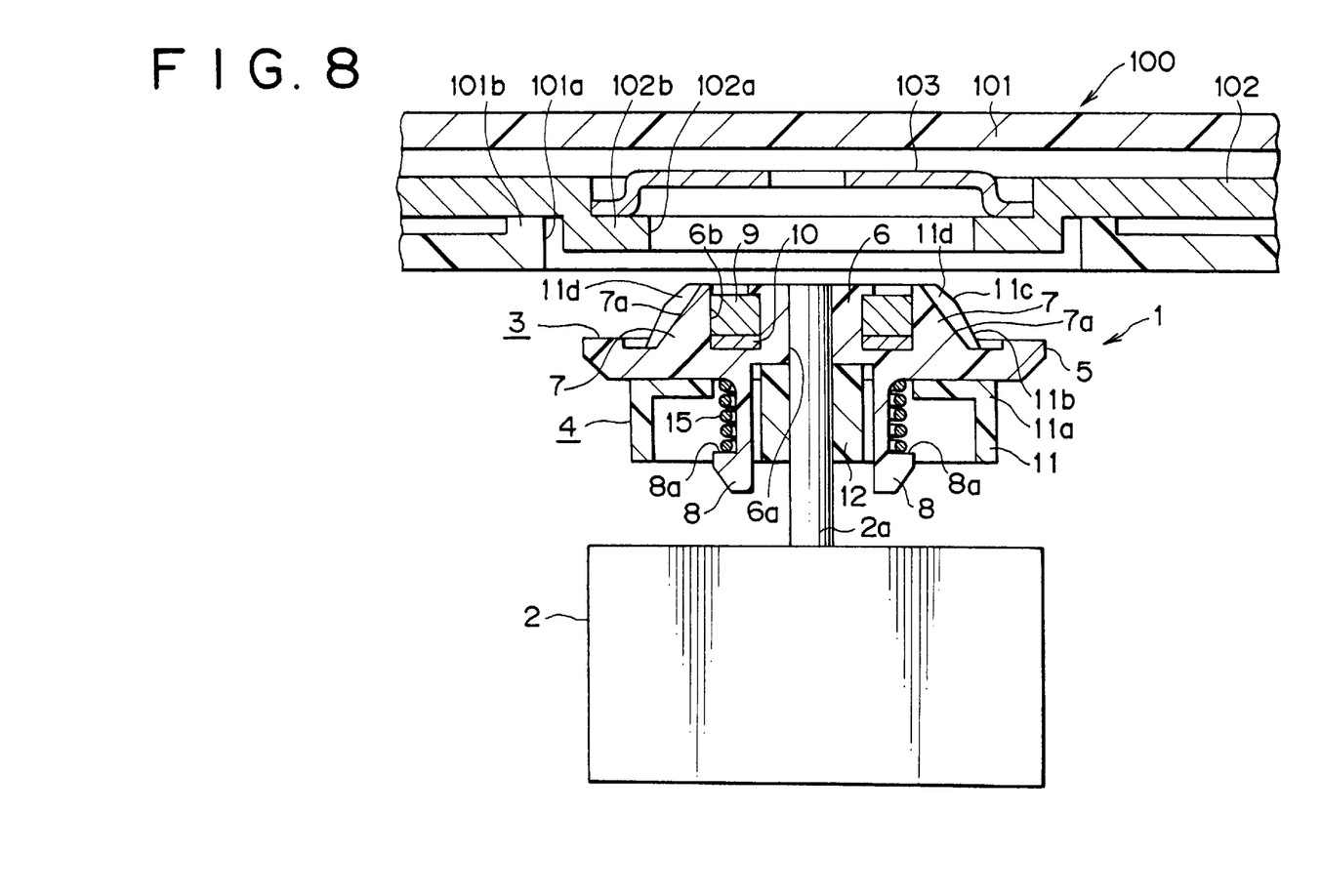
FIGS. 8 and 9 are vertical sectional views illustrating mounting operation of the disk centering apparatus to which the present invention is applied and particularly showing the disk centering apparatus before and after a disk-type storage medium is mounted, respectively.
Figure 9:
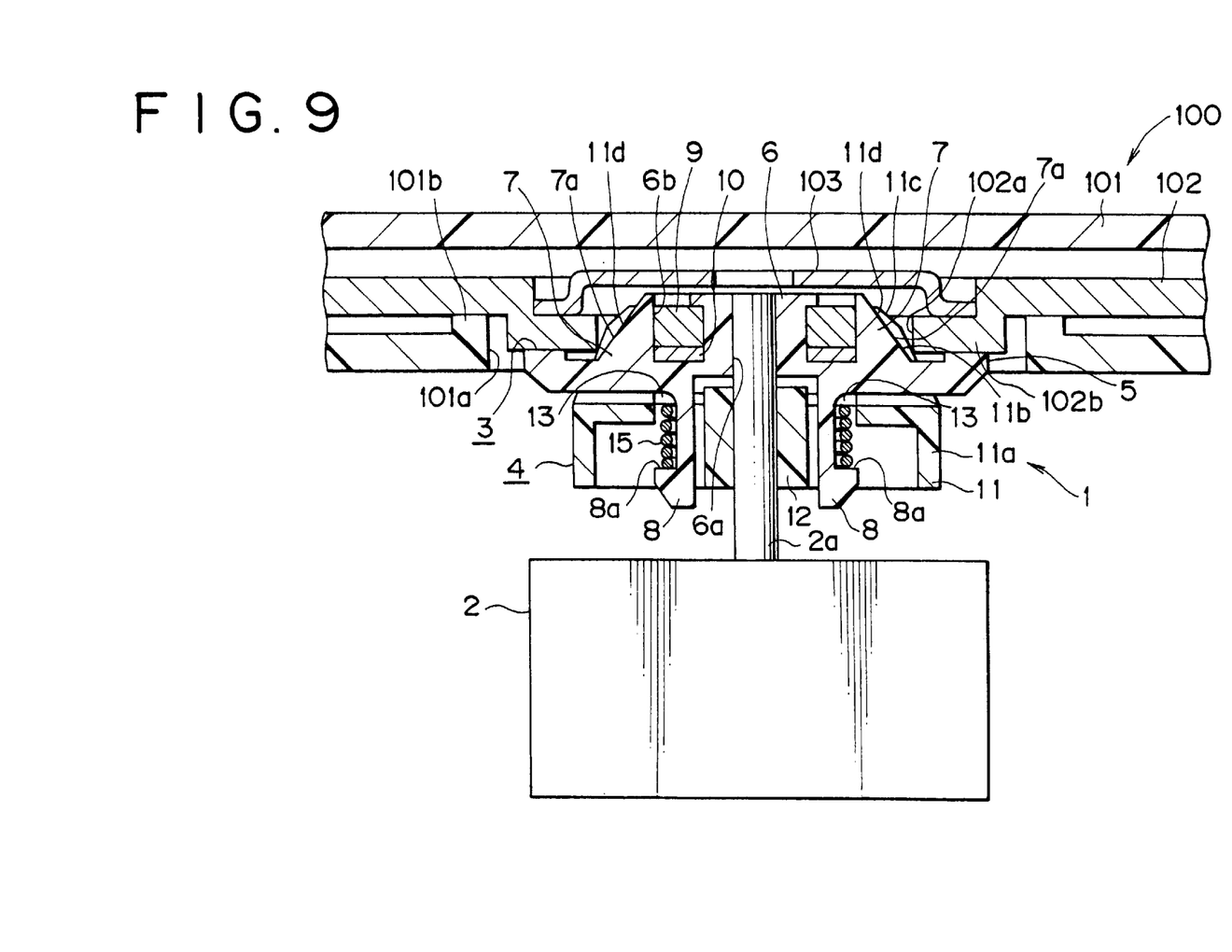

The disk centering apparatus is generally denoted at 1 as seen in FIGS. 8 and 9. The disk centering apparatus 1 is disposed in the inside of a disk recording and/or playback apparatus not shown and driven to rotate by driving force of a spindle motor 2. The disk centering apparatus 1 includes a movable member 4 supported on a disk table member 3 for movement in an axial direction of a motor shaft 2a of the spindle motor 2.

Figure 4:
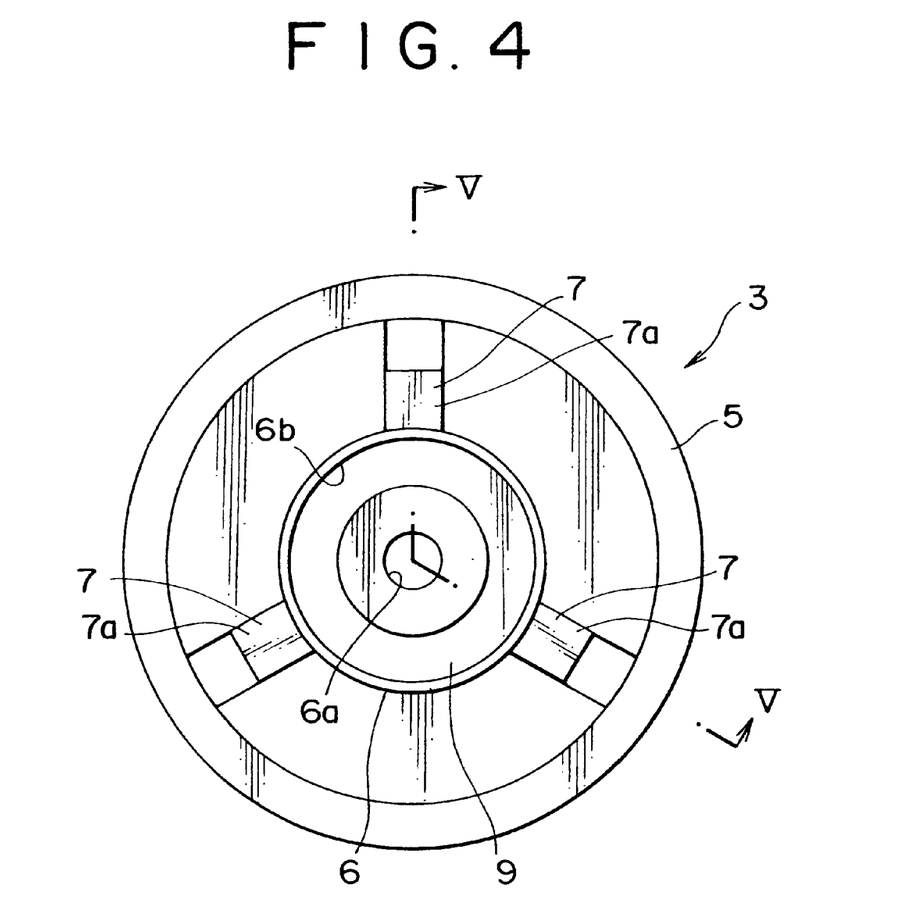
FIG. 4 is a top plan view showing a disk table member of a disk centering apparatus to which the present invention is applied.
Figure 5:
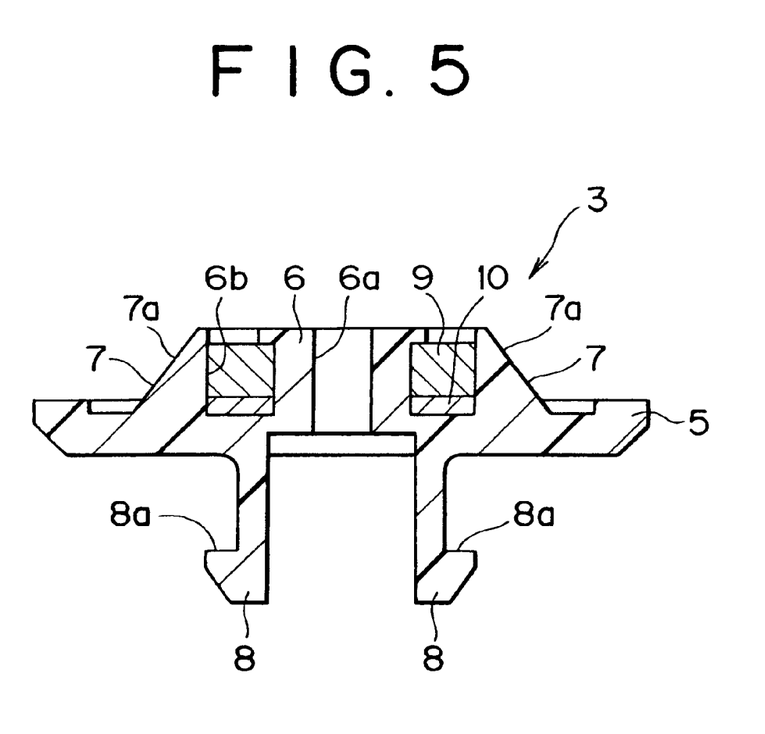
FIG. 5 is a sectional view taken along line V—V of FIG. 4.

Referring particularly to FIGS. 4 and 5, the disk table member 3 is formed as a unitary member typically by insert molding from an outer circumferential portion 5, an inner circumferential portion 6, three connecting portions 7, three spring receiving legs 8, a magnet 9, and a yoke 10. The magnet 9 is embedded in the inner circumferential portion 6 and functions as an attracting element.

The outer circumferential portion 5 is formed as a substantially annular member of a small thickness. The top surface of the outer circumferential portion 5 serves as a disk receiving face on which a disk-type recording medium is to be placed.

The inner circumferential portion 6 has a substantially cylindrical shape of a thickness greater than that of the outer circumferential portion 5 and has a vertically extending through-hole 6a formed at a central portion thereof. The inner circumferential portion 6 has a receiving recess 6b formed therein such that it is open upwardly and extends in a circumferential direction. The magnet 9 and the yoke 10 both having an annular shape are disposed in a layered relationship to each other in the receiving recess 6b. The top surface of the inner circumferential portion 6 is positioned higher than the top surface of the inner circumferential portion 6.

The connecting portions 7 extend in radial directions and are positioned at equal distances from each other in a circumferential direction. The connecting portions 7 connect the outer circumferential portion 5 and the inner circumferential portion 6 to each other. The connecting portions 7 have inclined faces 7a formed thereon such that they are displaced outwardly downwards.

The three spring receiving legs 8, of which only two are shown in FIG. 5, extend downwardly from the bottom surface of the inner circumferential portion 6 and have spring receiving lugs 8a formed at the bottom ends thereof such that they extend outwardly.

Figure 6:
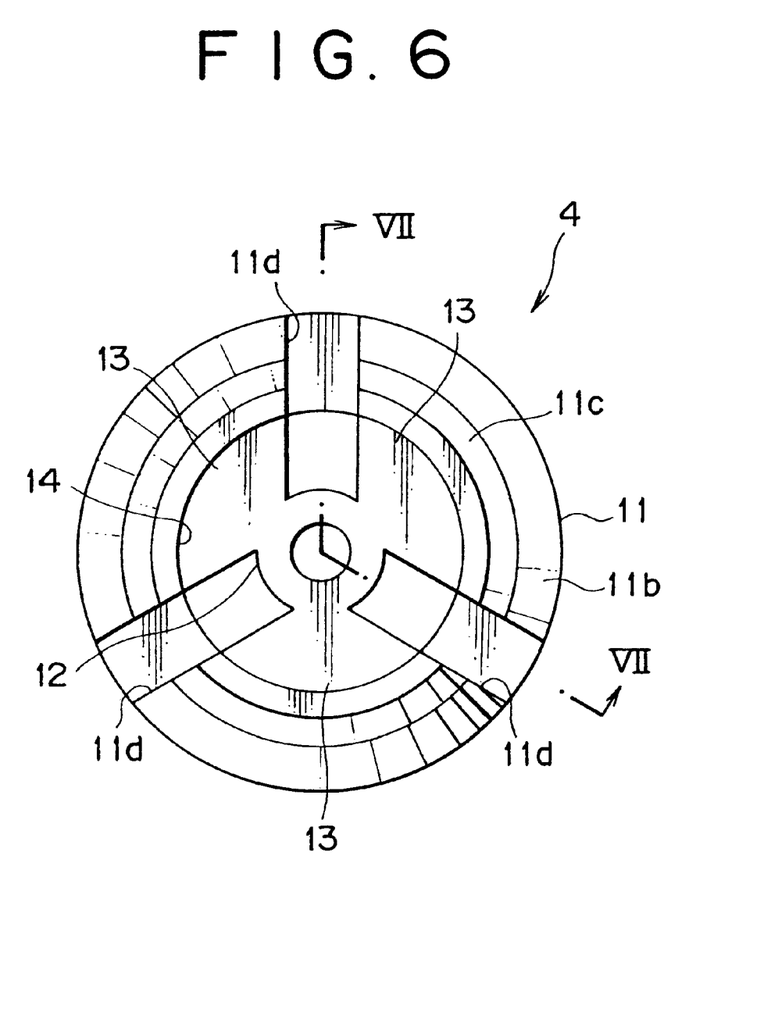
FIG. 6 is a top plan view showing a movable member of the disk centering apparatus to which the present invention is applied.
Figure 7:
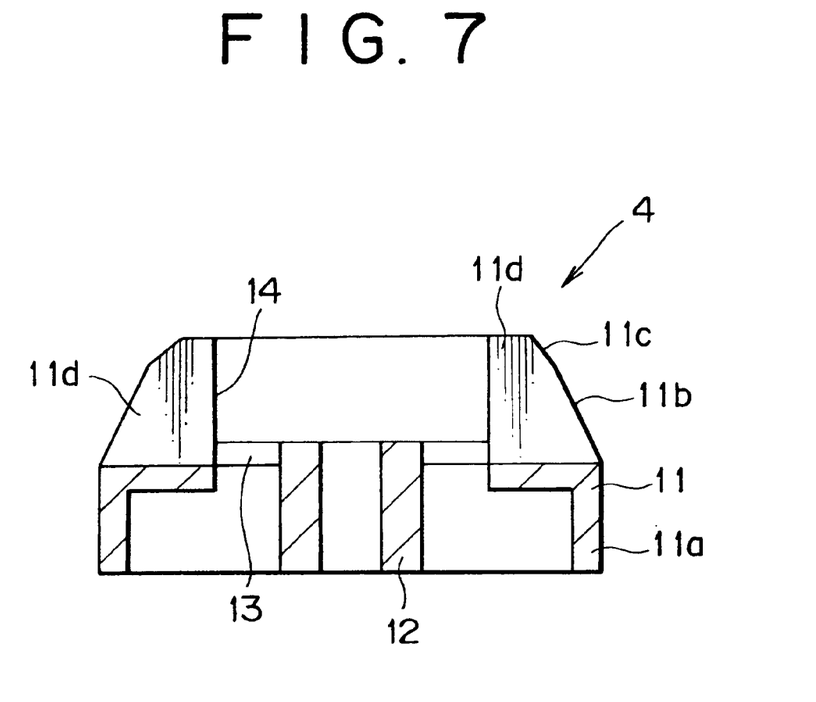
FIG. 7 is a sectional view taken along line VII—VII of FIG. 6.

Referring now to FIGS. 6 and 7, the movable member 4 is formed as a unitary member from an outer circumferential wall portion 11, a supported shaft portion 12 and three controlled portions 13.

The outer circumferential wall portion 11 includes a base end portion 11a having a cylindrical shape, a receiving portion 11b contiguous to the base end portion 11a and having an outer surface inclined upwardly inwards, and a guiding portion 11c contiguous to the receiving portion 11b and having an outer surface inclined further upwardly inwards. The receiving portion 11b has a thickness greater than the guiding portion 11c. Further, the inclination angle of the guiding portion 11c with respect to the base end portion 11a is greater than that of the receiving portion 11b.

The outer circumferential wall portion 11 has three guided grooves lid formed in the receiving portion 11b and the guiding portion 11c thereof. The guided grooves 11d are formed in an equidistantly spaced relationship from each other in a circumferential direction and are open upwardly.

The supported shaft portion 12 is formed in a cylindrical shape and extends in the vertical direction.

The controlled portions 13 are formed as flat plates of a substantially sectoral shape and positioned in an equidistantly spaced relationship from each other in a circumferential direction. The supported shaft portion 12 is connected at the top end thereof to the outer circumferential wall portion 11 through the controlled portions 13. The receiving portion 11b and the guiding portion 11c of the outer circumferential wall portion 11 and the controlled portions 13 cooperatively define a recess 14 which is open upwardly.

Referring to FIGS. 8 and 9, the movable member 4 is supported for sliding movement on the motor shaft 2a with the motor shaft 2a of the spindle motor 2 inserted in the supported shaft portion 12 thereof. The disk table member 3 is secured to the upper end of the motor shaft 2a typically by force fitting with the motor shaft 2a inserted in the throughhole 6a thereof.

While the movable member 4 is supported on the motor shaft 2a and the disk table member 3 is secured to the motor shaft 2a in this manner, the connecting portions 7 of the disk table member 3 are inserted in the guided grooves 11d of the movable member 4. The movable member 4 is movable in the axial direction of the motor shaft 2a with the guided grooves 11d thereof guided by the connecting portions 7. The outer surface of the receiving portion 11b and the outer surface of the guiding portion 11c of the movable member 4 are positioned outwardly of the inclined faces 7a of the connecting portions 7 of the disk table member 3 as seen in FIGS. 8 and 9.

A compression coil spring 15 is interposed in a compressed state between the spring receiving lugs 8a of the spring receiving legs 8 of the disk table member 3 and the controlled portions 13 of the movable member 4 and normally exerts force for biasing the movable member 4 upwardly. Accordingly, when no external force acts, the movable member 4 is positioned such that the top surfaces of the controlled portions 13 thereof contact with the bottom surface of the inner circumferential portion 6 of the disk table member 3 as seen in FIG. 8.

A magneto-optical disk 100 is inserted from an insertion entrance not shown of the disk recording and/or playback apparatus and mounted onto the disk centering apparatus 1 as seen in FIGS. 8 and 9.

The magneto-optical disk 100 includes a flattened disk cartridge 101 of a substantially rectangular shape, and a disk-type recording medium 102 of a diameter of approximately 64 mm accommodated for rotation in the disk cartridge 101. The disk cartridge 101 has an insertion hole 101a formed at a central portion of a lower wall thereof. The disk cartridge 101 further has a receiving projection 101b provided at an opening edge of the insertion hole 101a thereof. The receiving projection 101b has an annular shape and extends upwardly.

The disk-type recording medium 102 has a center hole 102a formed in a stepped portion 102b thereof. The stepped portion 102b is offset downwardly from the other portion of the disk-type recording medium 102, and a chucking plate 103 of a substantially annular shape is secured to the stepped portion 102b. The chucking plate 103 is made of a magnetic metal material and functions as a chucking member.

When the magneto-optical disk 100 is inserted into the insertion entrance of the disk recording and/or playback apparatus, it is held by a holder not shown provided in the disk recording and/or playback apparatus. Before the magneto-optical disk 100 is mounted onto the disk centering apparatus 1, it is received at a portion rather near to the inner periphery of the disk-type recording medium 102 thereof by the receiving projection 101b as shown in FIG. 8.

The magneto-optical disk 100 is mounted onto the disk centering apparatus 1 in the following manner as shown in FIGS. 8 and 9.

When the magneto-optical disk 100 is moved downwardly by a downward movement of the holder, part of the disk centering apparatus 1 is inserted into the insertion hole 101a of the disk cartridge 101. As the magneto-optical disk 100 is further moved downwardly, the inner circumferential portion 6 of the disk table member 3 and the guiding portion 11c of the movable member 4 are inserted into the center hole 102a of the disk-type recording medium 102.

As the magneto-optical disk 100 is further moved down by the downward movement of the holder, the receiving portion 11b of the movable member 4 is inserted into the center hole 102a until the lower side opening end of the center hole 102a is brought into contact with the receiving portion 11b. Then, by the further downward movement of the magneto-optical disk 100, the movable member 4 is moved downwardly against the biasing force of the compression coil spring 15 until the stepped portion 102b of the disk-type recording medium 102 is brought into contact with the top surface, that is, the disk receiving face of the outer circumferential portion 5 of the disk table member 3. At this time, the chucking plate 103 is attracted to the magnet 9 provided on the disk table member 3 so that the disk-type recording medium 102 is held by the disk centering apparatus 1.

As the magneto-optical disk 100 is further moved down by the movement of the holder, the bottom surface of the disk cartridge 101 is moved away from the disk-type recording medium 102 held by the disk centering apparatus 1. By the movement of the bottom surface of the disk cartridge 101 away from the disk-type recording medium 102, the mounting operation of the magneto-optical disk 100 onto the disk centering apparatus 1 is completed to establish a state wherein the disk-type recording medium 102 can be rotated as seen from FIG. 9.

When the spindle motor 2 is rotated, the disk centering apparatus 1 is rotated to rotate the disk-type recording medium 102, whereupon recording or playback of an information signal onto or from the disk-type recording medium 102 is performed. In particular, an information signal is read out from the disk-type recording medium 102 by an optical pickup apparatus not shown and reproduced, or an information signal is read out from the disk-type recording medium 102 by means of a magnetic head not shown. Alternatively, phase change recording wherein a crystal structure is changed using a laser beam may be employed.

In the disk centering apparatus 1, when the magneto-optical disk 100 is to be mounted, the movable member 4 is moved in an axial direction of the motor shaft 2a of the spindle motor 2 by movement of the magneto-optical disk 100 and the receiving portion 11b of the outer circumferential wall portion 11 is inserted into the center hole 102a of the disk-type recording medium 102 as described above. Therefore, even if the center hole 102a is formed with some dimensional tolerance by working, the eccentricity of the disk-type recording medium 102 in its mounted position can be suppressed to the minimum.

Further, in the disk centering apparatus 1, the guiding portion 11c is formed on the movable member 4 and moved. Therefore, even if the disk-type recording medium to be mounted has a rather small center hole, the disk-type recorded medium is mounted at an appropriate position in which the lower side opening edge of the center hole thereof contacts with the guiding portion 11c. Consequently, the disk-type recording medium can be mounted without fail and can be centered appropriately without depending upon the type thereof.

Further, since the receiving portion 11b and the guiding portion 11c are formed integrally with each other, reduction of the number of parts of the disk centering apparatus 1 can be achieved. Besides, since only one member, that is, only the disk table member 3, is secured to (force fitted with) the motor shaft 2a of the spindle motor 2, augmentation in efficiency of the assembling operation can be anticipated.

In addition, in the disk centering apparatus 1, the magnet 9 is formed integrally with the disk table member 3. Therefore, reduction of the production cost of the disk centering apparatus 1 can be anticipated and also augmentation of the accuracy in molding of the disk centering apparatus 1 can be anticipated.

Figure 10:
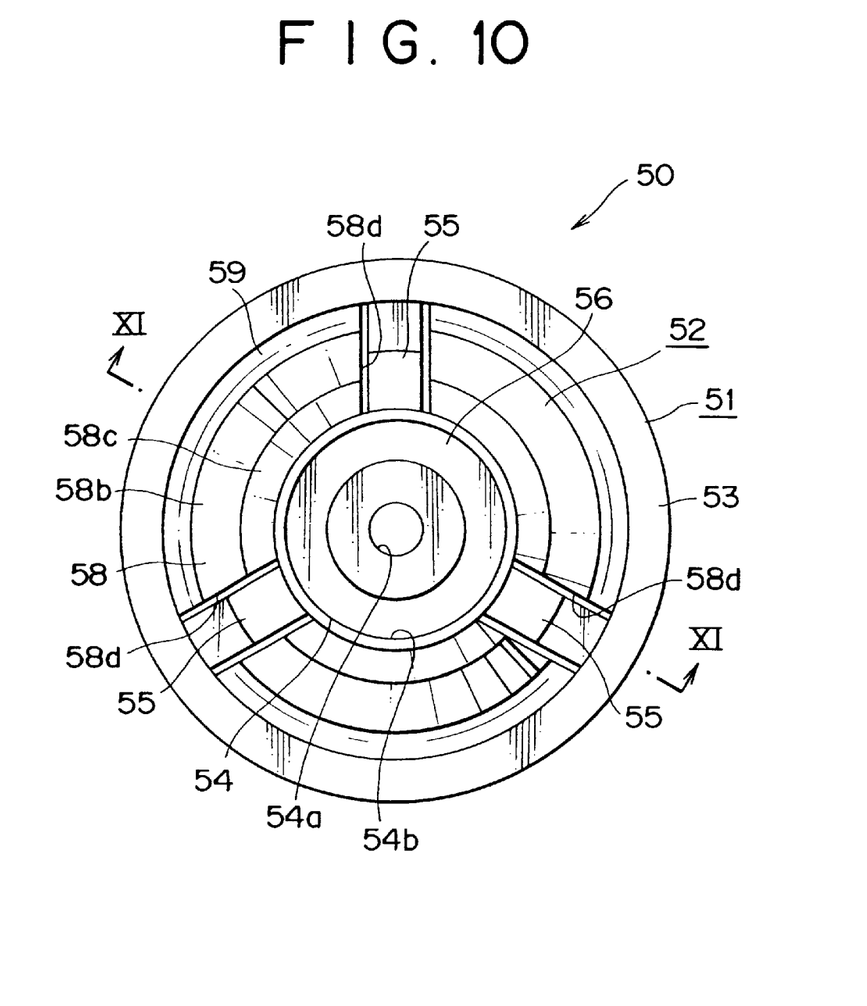
FIG. 10 is a top plan view showing another disk centering apparatus to which the present invention is applied.
Figure 11:
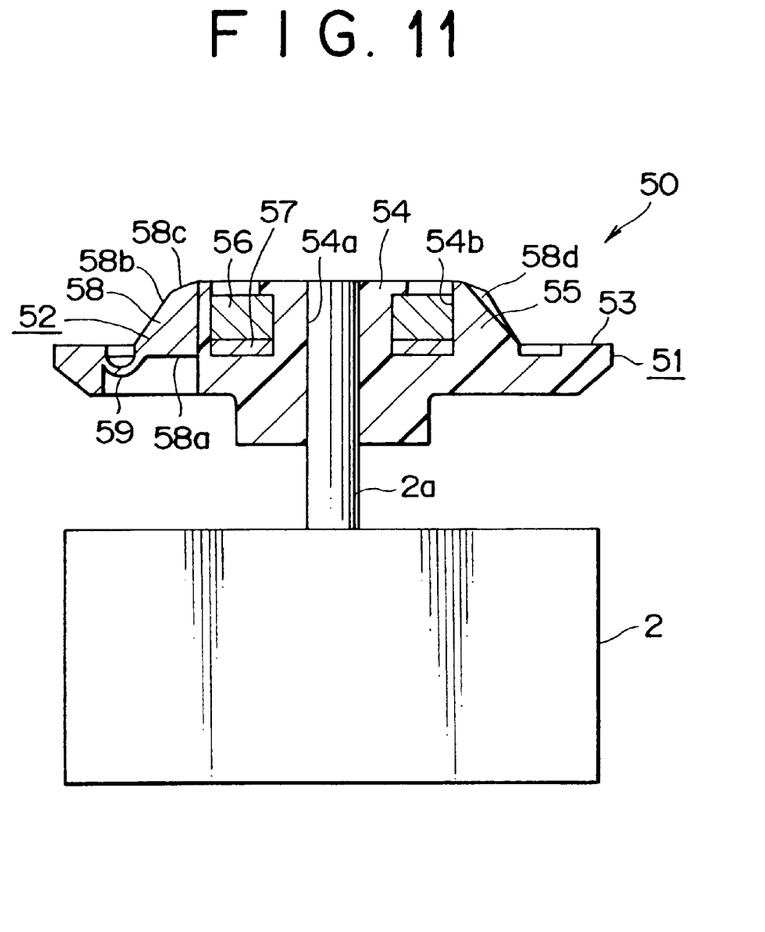
FIG. 11 is a sectional view taken along line XI—XI of FIG. 10 showing the disk centering apparatus when it is fixed to a motor shaft of a spindle motor.

Referring now to FIGS. 10 and 11, there is shown another disk centering apparatus to which the present invention is applied.

The disk centering apparatus of the present embodiment is generally denoted at 50 and includes a disk table member 51 and a movable member 52 formed as a unitary member.

The disk table member 51 is formed as a unitary member typically by insert molding from an outer circumferential portion 53, an inner circumferential portion 54, three connecting portions 55, a magnet 56 and a yoke 57.

The outer circumferential portion 53 is formed as a substantially annular member of a small thickness.

The inner circumferential portion 54 is a substantially cylindrical member having a thickness greater than the outer circumferential portion 53, and has a vertically extending through-hole 54a formed at a central portion thereof. The inner circumferential portion 54 has a receiving recess 54b formed thereon. The receiving recess 54b is open upwardly and extends in a circumferential direction. The magnet 56 and the yoke 57 both having an annular configuration are disposed in a layered relationship to each other in the receiving recess 54b. The top surface of the inner circumferential portion 54 is positioned higher than the top surface of the outer circumferential portion 53.

The connecting portions 55 extend in radial directions and are positioned in an equidistantly spaced relationship from each other in a circumferential direction. The connecting portions 55 connect the outer circumferential portion 53 and the inner circumferential portion 54 to each other.

The movable member 52 includes a circumferential wall portion 58 and a reduced thickness hinge portion 59.

The circumferential wall portion 58 includes a base end portion 58a positioned at a lower position and formed as a thin annular member, a receiving portion 58b contiguous to the base end portion 58a and having an outer surface inclined upwardly inwards, and a guiding portion 58c contiguous to the receiving portion 58b and having an outer surface inclined further upwardly inwards. The receiving portion 58b has a thickness greater than that of the guiding portion 58c, and the guiding portion 58c has an inclination angle greater than that of the receiving portion 58b with respect to the base end portion 58a.

The circumferential wall portion 58 has three receiving recesses 58d formed in an equidistantly spaced relationship from each other in a circumferential direction for individually receiving the three connecting portions 55 of the disk table member 51.

The circumferential wall portion 58 is connected at the base end portion 58a thereof to the outer circumferential portion 53 of the disk table member 51 by the reduced thickness hinge portion 59. When no external force is applied, the top end of the circumferential wall portion 58 is positioned at an equal height to that of the top end of the inner circumferential portion 54. Since the circumferential wall portion 58 is connected to the outer circumferential portion 53 by the reduced thickness hinge portion 59 in this manner, the circumferential wall portion 58 can be slidably moved in the upward and downward directions, that is, in an axial direction of the motor shaft 2a of the spindle motor 2 with respect to the inner circumferential portion 54 of the disk table member 51.

The disk table member 51 is secured typically by force fitting to the motor shaft 2a of the spindle motor 2 with the motor shaft 2a inserted in the through-hole 54a thereof.

When the magneto-optical disk 100 is moved downwardly in order to mount it onto the disk centering apparatus 50, the lower side opening edge of the center hole 102a of the disk-type recording medium 102 pushes the receiving portion 58b downwardly to move the circumferential wall portion 58 of the movable member 52 downwardly with respect to the inner circumferential portion 54 of the disk table member 51 thereby to center the magneto-optical disk 100.

When the magneto-optical disk 100 is dismounted from the disk centering apparatus 50, the circumferential wall portion 58 is moved upwardly to its original position, that is, to the position in which it has an equal height to that of the top end of the inner circumferential portion 54, by the biasing force of the reduced thickness hinge portion 59.

As described above, the disk centering apparatus 50 is advantageous, similarly as the disk centering apparatus 1, in that, even if the center hole 102a of the disk-type recording medium 102 is formed with some dimensional tolerance in diameter by working, the eccentricity of the disk-type recording medium 102 in its mounted position can be suppressed to the minimum, and also in that the disk-type recording medium 102 can be centered appropriately irrespective of the type of the disk-type recording medium 102. Further, since the disk table member 51 and the movable member 52 are formed integrally with each other, reduction of the number of parts and hence reduction of the production cost can be anticipated.

Further, in both of the embodiments described hereinabove, the receiving portion for receiving the inner circumferential edge of a disk-type recording medium to be mounted is provided on the movable member, and the receiving portion and the guiding portion are formed as a unitary member. Consequently, the disk centering apparatus can be formed from a reduced number of parts. Further, since only one member, that is, only the disk table member, is secured to (force fitted with) the motor shaft of the spindle motor, augmentation of the efficiency in assembling operation can be anticipated.

Further, the attracting portion for attracting the chucking member, which is positioned on the opposite side with respect to the disk-type recording medium, to cooperatively hold the disk-type recording medium therebetween is provided and molded integrally with the disk table member. Therefore, the disk centering apparatus can be produced at a reduced cost and with a high degree of accuracy in molding.

While preferred embodiments of the present invention have been described using specific terms, such description is for illustrative purposes only, and it is to be understood that changes and variations may be made without departing from the spirit or scope of the following claims.

What is claimed is:

1. A disk centering apparatus, comprising:
    a disk table member including a substantially cylindrical inner circumferential element secured to an upper portion of a motor shaft and a substantially annular outer circumferential element disposed lower than an upper surface of and concentrically with said inner circumferential element and having a diameter greater than that of said inner circumferential element, said outer circumferential element having an upper surface which serves as a receiving face for receiving a disk thereon, said disk table member further including a plurality of connecting elements extending radially from an outer side of said inner circumferential element to connect said inner circumferential element and said outer circumferential element to each other; and
    a movable member including a substantially cylindrical supported shaft element mounted for sliding movement on said motor shaft, said supported shaft element being disposed lower than said disk table member, said movable member further including a guiding element provided adjacent an outer circumferential surface side of said supported shaft element for movement together with said supported shaft element and fitted in a space defined by said inner circumferential element, said outer circumferential element and said connecting elements of said disk table member, said guiding element having a guiding inclined element formed at an upper portion thereof for guiding a center hole of the disk, said guiding inclined element having a diameter greater than that of said inner circumference element of said disk table member, said movable member being biased upwardly in a direction of said motor shaft.

2. The disk centering apparatus according to claim 1, wherein said movable member further includes a substantially annular controlled element extending outwardly from an upper portion of said supported shaft element thereof and having an upper surface with which a lower surface of said inner circumferential element contacts, and said controlled element of said movable member has recesses formed at positions thereof corresponding to said connecting elements and said connecting elements of said disk table member are fitted in said recesses, said guiding element being provided on an outer circumferential surface side of said controlled element.

3. The disk centering apparatus according to claim 2, wherein said disk table member further includes a spring receiving element extending in a downward direction from the lower surface of said inner circumferential element, and said spring receiving element has a spring supporting element formed at an end thereof and extending outwardly.

4. The disk centering apparatus according to claim 3, wherein said movable member is biased upwardly in the direction of said motor shaft by biasing means provided between an upper surface of said spring receiving element of said disk table member and a lower surface of said controlled element of said movable member.

5. The disk centering apparatus according to claim 4, wherein said inner circumferential element of said disk table member has an attracting element provided on an upper surface thereof for cooperating with a chucking member to hold therebetween a disk mounted on said disk table member.

6. The disk centering apparatus according to claim 5, wherein said attracting element includes a magnet embedded in the upper surface of said inner circumferential element of said disk table member.

7. A disk centering apparatus, comprising:
    a substantially cylindrical inner circumferential element secured to an upper portion of a motor shaft;
    a substantially annular outer circumferential element disposed lower than an upper surface of and concentrically with said inner circumferential element and having a diameter greater than that of said inner circumferential element, said outer circumferential element having an upper surface which serves as a receiving face for receiving a disk thereon;
    a plurality of connecting elements extending radially from an outer side of said inner circumferential element to connect said inner circumferential element and said outer circumferential element to each other; and
    a movable member disposed at a position defined by said inner circumferential element, said outer circumferential element and said connecting elements for connecting said inner circumferential element and said outer circumferential element to each other, said movable member having a guiding inclined portion formed at an upper portion thereof for guiding a center hole of the disk, said movable member being slidably movable in a direction of said motor shaft;
    said inner circumferential element, said outer circumferential element and said movable element being formed as a unitary member.

8. The disk centering apparatus according to claim 7, wherein a portion of said movable member at which said movable member is connected to said outer circumferential element is formed with a reduced thickness to allow the sliding movement of said movable member in the direction of said motor shaft.

9. The disk centering apparatus according to claim 8, wherein said inner circumferential element of said disk table member has an attracting element provided on an upper surface thereof for cooperating with a chucking member to hold therebetween a disk mounted on said disk table member.

10. The disk centering apparatus according to claim 9, wherein said attracting element includes a magnet embedded in the upper surface of said inner circumferential element of said disk table member.

11. A disk playback apparatus, comprising:
    a spindle motor having a motor shaft;
    a disk table member including a substantially cylindrical inner circumferential element secured to an upper portion of said motor shaft and a substantially annular outer circumferential element disposed lower than an upper surface of and concentrically with said inner circumferential element and having a diameter greater than that of said inner circumferential element, said outer circumferential element having an upper surface which serves as a receiving face for receiving a disk thereon, said disk table member further including a plurality of connecting elements extending radially from an outer side of said inner circumferential element to connect said inner circumferential element and said outer circumferential element to each other;

a movable member including a substantially cylindrical supported shaft element mounted for sliding movement or said motor shaft, said supported shaft element being disposed lower than said disk table member, said movable member further including a guiding element provided adjacent an outer circumferential surface side of said supported shaft element for movement together with said supported shaft element and fitted in a space defined by said inner circumferential element, said outer circumferential element and said connecting elements of said disk table member, said guiding element having a guiding inclined element formed at an upper portion thereof for guiding a center hole of the disk, said guiding inclined element having a diameter greater than that of said inner circumference element of said disk table member, said movable member being biased upwardly in a direction of said motor shaft; and an optical pickup apparatus for reading out an information signal recorded on the disk mounted on said disk table member.

12. A disk playback apparatus, comprising:

a spindle motor having a motor shaft;

a substantially cylindrical inner circumferential element secured to an upper portion of said motor shaft;

a substantially annular outer circumferential element disposed lower than an upper surface of and concentrically with said inner circumferential element and having diameter greater than that of said inner circumferential element, said outer circumferential element having an upper surface which serves as a receiving face for receiving a disk thereon;

a plurality of connecting elements extending radially from an outer side of said inner circumferential element to connect said inner circumferential element and said outer circumferential element to each other;

a movable member disposed at a position defined by said inner circumferential element, said outer circumferential element and said connecting elements for connecting said inner circumferential element and said outer circumferential element to each other, said movable member having a guiding inclined portion formed at an upper portion thereof for guiding a center hole of the disk, said movable member being slidably movable in a direction of said motor shaft; and an optical pickup apparatus for reading out an information signal recorded on the disk mounted on said outer circumferential element;

said inner circumferential element, said outer circumferential element and said movable element being formed as a unitary member.

* * * * *